(12) United States Patent
Crolley

(10) Patent No.: US 8,726,199 B2
(45) Date of Patent: May 13, 2014

(54) SYSTEM AND METHOD FOR DISPLAYING IMAGES AND VIDEOS FOUND ON THE INTERNET AS A RESULT OF A SEARCH ENGINE

(75) Inventor: C. Wayne Crolley, Bryant, AR (US)

(73) Assignee: AT&T Intellectual Property I, LP, Atlanta, GA (US)

(*) Notice: Subject to any disclaimer, the term of this patent is extended or adjusted under 35 U.S.C. 154(b) by 763 days.

(21) Appl. No.: 12/342,432

(22) Filed: Dec. 23, 2008

(65) Prior Publication Data

US 2010/0162183 A1 Jun. 24, 2010

(51) Int. Cl.
*G06F 3/048* (2013.01)

(52) U.S. Cl.
USPC .............. 715/867; 715/764; 715/759

(58) Field of Classification Search
USPC ........................................... 715/867
See application file for complete search history.

(56) References Cited

U.S. PATENT DOCUMENTS

| | | | |
|---|---|---|---|
| 6,957,398 B1* | 10/2005 | Nayeri | 715/867 |
| 7,010,751 B2* | 3/2006 | Shneiderman | 715/232 |
| 7,072,884 B2 | 7/2006 | Kemp | |
| 7,185,292 B2* | 2/2007 | Pinsky et al. | 715/867 |
| 7,383,510 B2 | 6/2008 | Pry | |
| 7,467,382 B2* | 12/2008 | Watanabe | 718/100 |
| 7,735,026 B2* | 6/2010 | Kurzweil et al. | 715/867 |
| 2002/0032677 A1 | 3/2002 | Morgenthaler et al. | |
| 2004/0153445 A1 | 8/2004 | Horvitz et al. | |
| 2005/0010563 A1 | 1/2005 | Gross et al. | |
| 2005/0240961 A1* | 10/2005 | Jerding et al. | 725/37 |
| 2006/0080306 A1 | 4/2006 | Land et al. | |
| 2006/0149721 A1 | 7/2006 | Langford | |
| 2006/0190440 A1 | 8/2006 | Horvitz et al. | |
| 2007/0028174 A1* | 2/2007 | Moore et al. | 715/733 |
| 2007/0198951 A1 | 8/2007 | Frank | |
| 2007/0277127 A1* | 11/2007 | Carlson et al. | 715/867 |
| 2008/0086453 A1 | 4/2008 | Fabian | |
| 2008/0092051 A1 | 4/2008 | Sidon et al. | |
| 2008/0307339 A1* | 12/2008 | Boro et al. | 715/764 |
| 2009/0158222 A1* | 6/2009 | Kerr et al. | 715/867 |
| 2010/0107128 A1* | 4/2010 | Thukral | 715/867 |

* cited by examiner

*Primary Examiner* — William Titcomb
(74) *Attorney, Agent, or Firm* — Guntin & Gust, PLC; Ralph Trementozzi

(57) ABSTRACT

In response to entering a screensaver mode of operation, a search criteria identifying requested subject matter is transmitted to a search engine. A set of uniform resource locators are returned based upon the search criteria. A display image at a display device is updated periodically to display information referenced by the uniform resource locator.

24 Claims, 8 Drawing Sheets

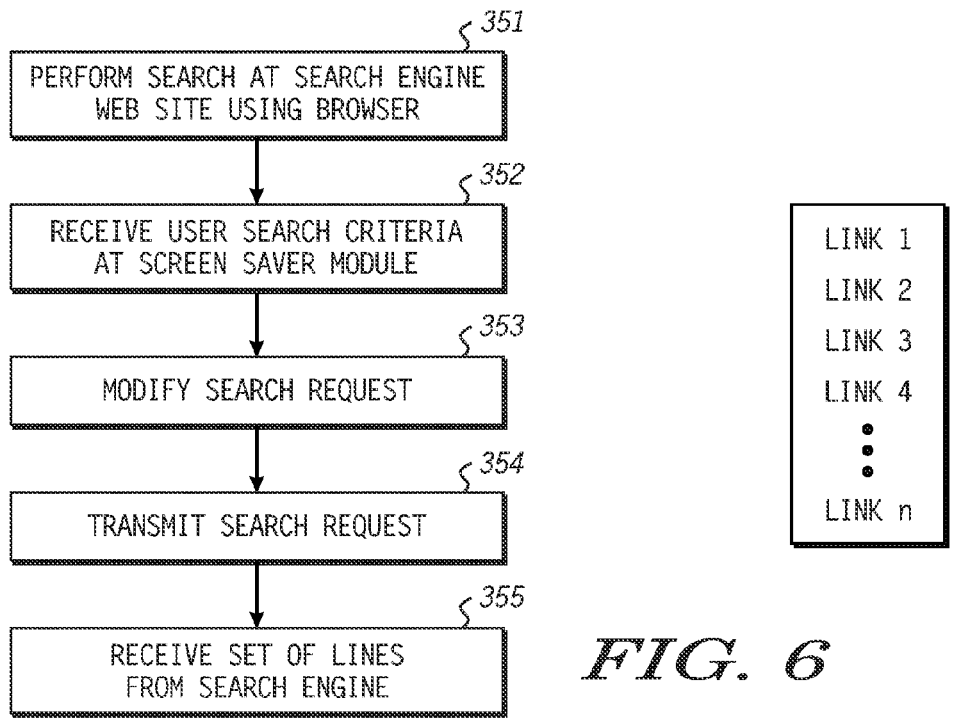
FIG. 5
FIG. 6
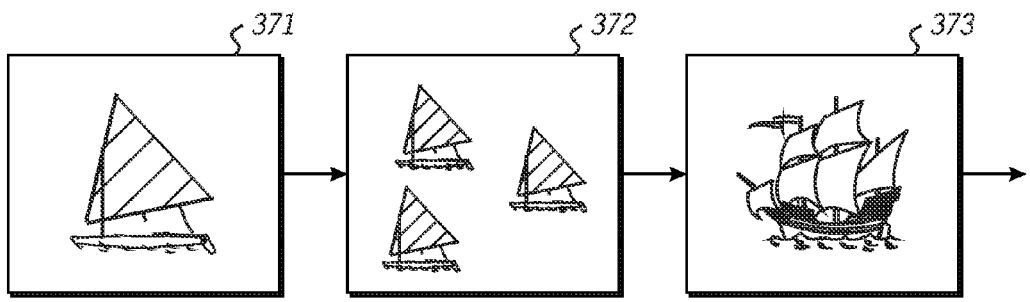
FIG. 7

SYSTEM AND METHOD FOR DISPLAYING IMAGES AND VIDEOS FOUND ON THE INTERNET AS A RESULT OF A SEARCH ENGINE

FIELD OF THE DISCLOSURE

The present disclosure generally relates to data processing and more particularly to providing display images.

BACKGROUND

Current screensavers display dynamic images or a sequence of images defined at a specific storage location of a data processing device. A screensaver providing more flexibility to a user would be useful.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 5 illustrates a flow diagram of a method in accordance with a specific embodiment of the present disclosure;

FIG. 6 illustrates a set of links in accordance with a specific embodiment of the present disclosure;

FIG. 7 illustrates a sequence of images sequentially displayed at a display device in accordance with a specific embodiment of the present disclosure disclosed at FIG. 8;

DETAILED DESCRIPTION OF THE DRAWINGS

Figure 1:
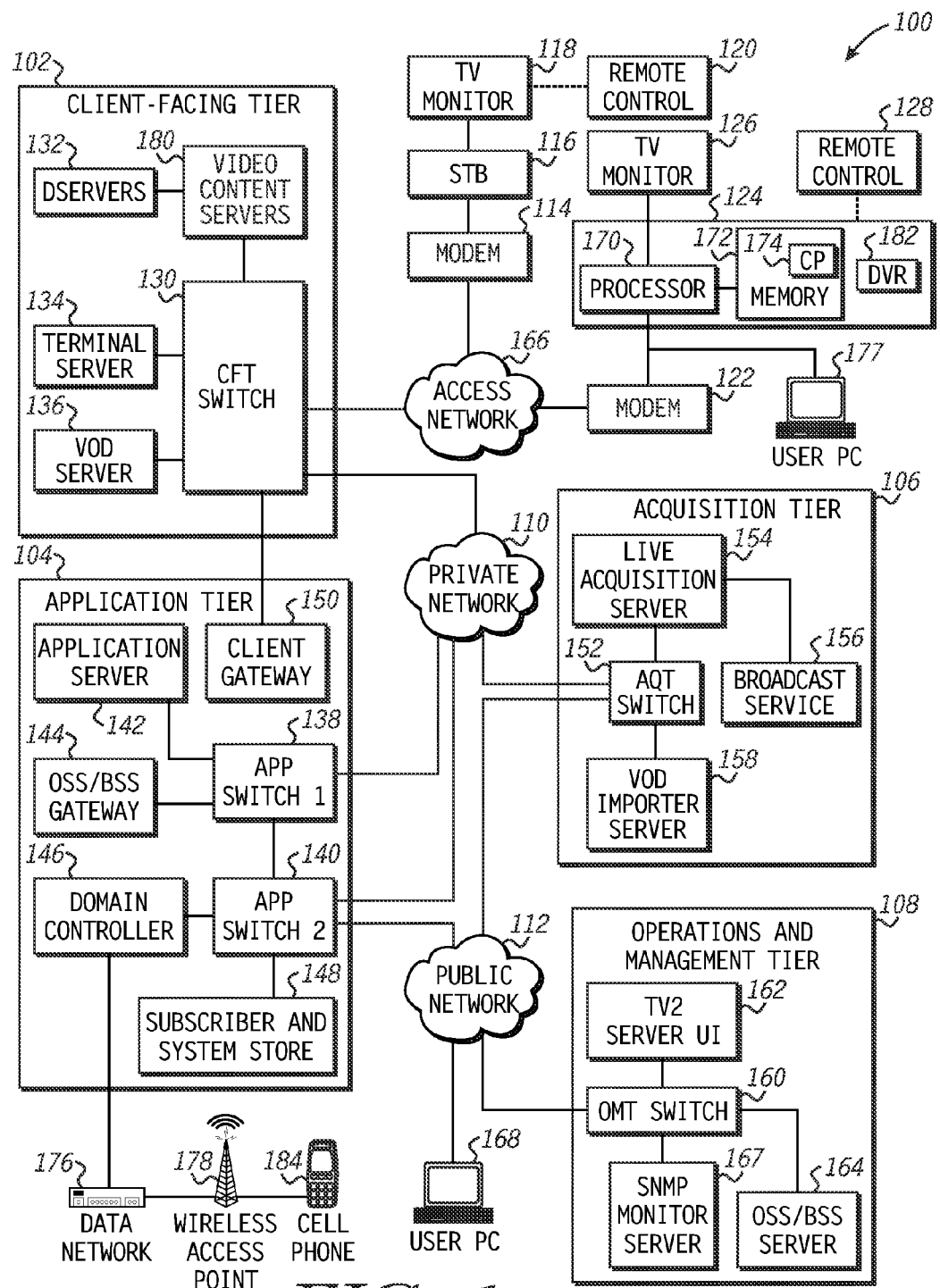
FIG. 1 illustrates a block diagram of a communication system in accordance with a specific embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In accordance with a specific embodiment of the present disclosure, a screensaver module at a data processor implements a screensaver mode of operation at a display device connected to the data processor. The screensaver module can be implemented at the data processor as either hardware or software. During screensaver mode, a search query is automatically initiated by the screensaver module based upon search criteria. Results of the search query are sequentially displayed at a display device during the screensaver mode. The screensaver mode described herein can be implemented at various data processing devices of the communication system 100 illustrated at FIG. 1.

The communication system 100 includes an IPTV system 100. The IPTV system include various data processing device at which the screensaver mode described herein can be implemented, including: a personal communication device e.g., cell phone 184; user personal computer 184; set-top box 116; and set-top box 124. The IPTV system 100 further includes a client facing tier 102, an application tier 104, an acquisition tier 106, and an operations and management tier 108. Each tier 102, 104, 106, and 108 is connected to one or both of a private network 110 and a public network 112. For example, the client-facing tier 102 can be connected to the private network 110, while the application tier 104 can be connected to the private network 110 and to the public network 112, such as the Internet. The acquisition tier 106 can also be connected to the private network 110 and to the public network 112. Moreover, the operations and management tier 108 can be connected to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network, to access various sources illustrated at FIG. 1 or otherwise accessible via the private network 110 or the public network 112. In an illustrative embodiment, modems such as a first modem 114 and a second modem 122 can be connected to the private access network 166. The client-facing tier 102 can communicate with a first representative multimedia processing device, such as set-top box (STB) device 116 via the first modem 114 and with a second representative multimedia processing device, such as set-top box device 124 and user personal computer 177 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be connected to the modems 114 and 122 via fiber optic cables. Alternatively, the modems 114 and 122 can be digital subscriber line (DSL) modems that are connected to one or more network nodes via twisted pairs, and the client-facing tier 102 can be connected to the network nodes via fiber-optic cables. Each set-top box device 116 and 124 can process data received from the private access network 166 via an IPTV software platform such as Microsoft® TV IPTV Edition.

The first set-top box device 116 can be connected to a first display device 118, such as a first television monitor, and the second set-top box device 124 can be connected to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is connected. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is connected to one or more data servers 132 that store data transmitted in response to user requests, such as video-on-demand material. The CFT switch 130 can also be connected to a terminal server 134 that provides terminal devices, such as a game application server and other devices with a common connection point to the private network 110. In a particular embodiment, the CFT switch 130 can also be connected to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be connected to the second APP switch 140. The first APP switch 138 can be connected to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be connected to a domain controller 146 that provides web access to users via the public network 112. The second APP switch 140 can be connected to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be connected directly to the CFT switch 130. The client gateway 150 can provide user access to the private network 110 and the tiers connected thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be connected to a live acquisition server 154 that receives television content, for example, from a broadcast service 156. Further, the AQT switch can be connected to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is connected to a TV2 server 162. Additionally, the OMT switch 160 can be connected to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 connected to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP). Various aspects of the present disclosure relating to the screensaver mode will be better understood with respect to FIGS. 2-15 below.

Figure 2:
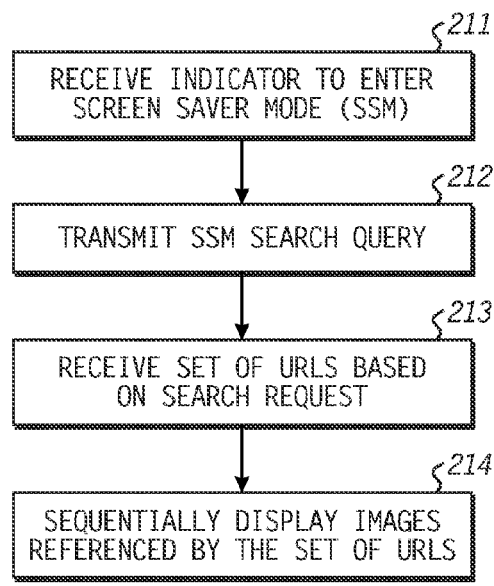
FIG. 2 illustrates a flow diagram of a method in accordance with a specific embodiment of the present disclosure.

FIG. 2 illustrates, in flow diagram form, a method of implementing a screensaver mode of operation at a data processing in accordance with a specific embodiment of the present disclosure. At a node 211, an indicator is received at the data processing device to enter a screensaver mode. The indicator can be provided in response to a timeout due to inactivity at the processing device, in response to a specific user action that places the processing device in screensaver mode, or in response to other indicators. It will be appreciated that the method illustrated at FIG. 2 can be implemented at any data processing device associated with a display, such as at set-top-box 116, set-top box 126, user PC 168, user PC 177, cell phone 184, and the like. For purposes of description, unless otherwise stated, it is presumed that the method of FIG. 2 is being implemented at user PC 168, and that upon receiving the indicator a screensaver module, which can be hardware or software at the data processing device, at user PC 168, implements the screensaver mode.

At node 212, after entering screensaver mode, a search query is transmitted from the screensaver module to a search engine, such as from user PC 168 to web-based search engine 181 of FIG. 1. For example, during screensaver mode a search query can be transmitted to one or more search engines, such as Yahoo, Google, and the like.

At node 213, a set of Uniform Resource Locators (URLs) is received at the data processing device from the search engine in response to the search query. The received URLs reference specific network locations where information matching the search criteria is found. For purposes of discussion, it is presumed that the search criteria of the screensaver query was limited to requests for image files. The term "image files," as used herein is intended to mean files having types primarily associated with images. The image files can be still image files or video files. Examples of image files include .JPG files, .TIF files, .GIF files, .MPG and the like.

At node 214, the processing device provides to a display device image content referred to by URLs of the set of URLs received at node 213, thereby sequentially displaying images at the display device during screensaver mode.

Figures 3, 4:
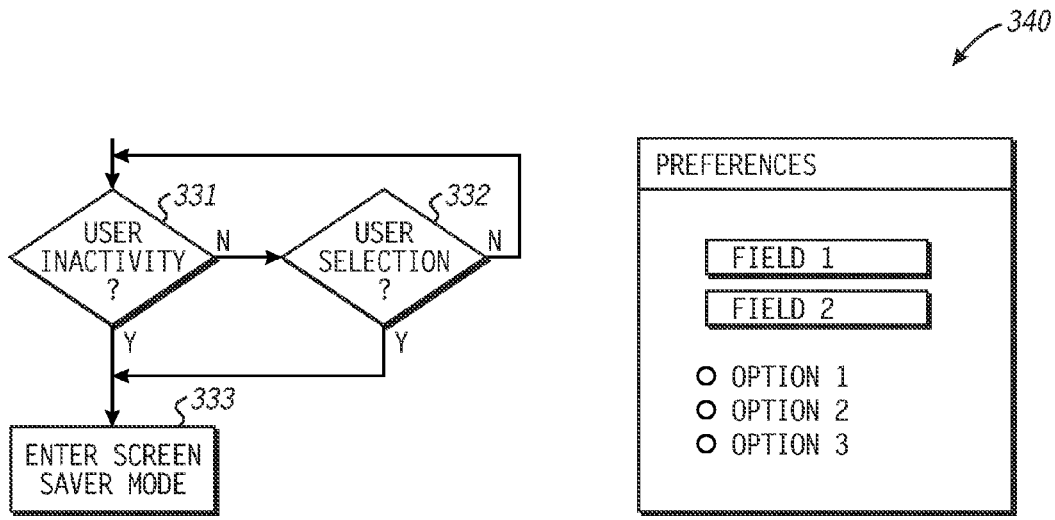
FIG. 3 illustrates a flow diagram of a method in accordance with a specific embodiment of the present disclosure.
FIG. 4 illustrates a preference window in accordance with a specific embodiment of the present disclosure.

FIG. 3 is a flow diagram of a method disclosing a specific embodiment of entering screensaver mode. Specifically, flow begins at node 331 where it is determined whether or not a sufficient amount of user inactivity has occurred at the data processor device. If so, flow proceeds to node 333 where the screensaver mode indicator is provided to the data processor to initiate screensaver mode should be entered. Otherwise, flow proceeds from node 331 to node 332, where it is determined whether or not a user action has occurred to cause the screensaver mode indicator to be generated. If so, flow proceeds to node 333, otherwise flow returns to node 331 until screensaver mode is entered.

FIG. 4 shows a screen shot of a preference window 340 being displayed at the display device of the data processor where operation of screensaver mode can get configured prior to entering screensaver mode. Desired subject matter of the search criteria can be entered by the user at the preference window 340 at input field labeled "FIELD 1", at input field labeled "FIELD 2". Pre-defined options labeled "OPTION 1", "OPTION 2", and "OPTION 3" are user selectable by enabling associated indicators, such as radio button. The screensaver module will use the user inputs and selections provided at the preference window 340 to generate and transmit a search query to a search engine as previously described at node 212 of FIG. 2. For example, the user could provide search criteria by entering the term "sailboat" t FIELD 1, and enabling one of the options OPTION 1 through OPTION 3 that limits the search to still images. Note that in a specific embodiment, FIELD 2 can represent a second set of search criteria that is also searched upon entering screensaver mode, a URL to a search engine to be used, or any other information.

FIG. 5 illustrates a flow diagram of a method in accordance with another embodiment of defining search criteria to be used during screensaver mode. At node 351, the user performs a search at a search engine website using a browser. For example, the user could submit the word "sailboat" as the search criteria at the search engine website.

At node 352, criteria from the last search performed by the user are received at the screensaver module from the search engine. For example, a browser applet can store the last performed search at a location accessible by the screensaver module. In one embodiment, the browser applet can store the last performed search criteria at a memory location corresponding to a field, such as FIELD 2, of the preference window of FIG. 4, whereby the last search would be displayed at FIELD 2. Note that one of OPTION 1 through OPTION 3 illustrated at the preference window 340 can be selected to indicate that the screensaver module is to use the last search criteria provided by the user to a search engine prior to entering screensaver mode.

At node 353, the user search can be modified by the screensaver module. For example, the user provided search criteria of "sailboat" can be further qualified to indicate only image files of sailboats are to be identified. It will be appreciated that other search criteria can be added to the user provided search criteria as well. For example, a criteria requesting content appropriate for a certain age group, or a criteria excluding URLs can be specified.

At node 354, the modified search query is transmitted from the screensaver module to the search engine as a result of entering screensaver mode. At node 355, the set of URLs based upon the modified search criteria is returned to the data processor from the search engine.

A representation of a set of URL returned from a search engine in response to the search query by the screensaver module is illustrated at FIG. 6. Specifically illustrated at FIG. 6 is a table containing URLs labeled LINK1-LINKn, where "n" is an integer indicating the total number of URLs. It will be appreciated that each of these URLs references a network file, such as an image file, deemed by the search engine to meet the search criteria.

Figure 8:
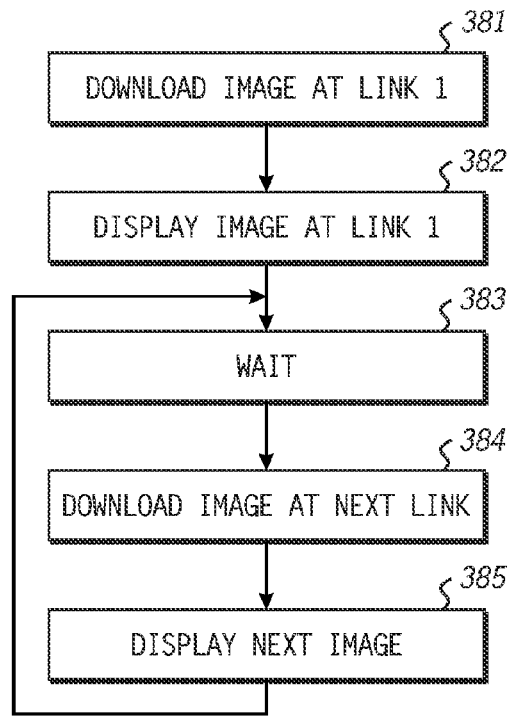
FIG. 8 illustrates a flow diagram of a method in accordance with a specific embodiment of the present disclosure.

FIG. 7 illustrates a sequence of images displayed at a display device during screensaver mode, as indicated at node 214 of FIG. 2. For example, during screensaver image 371 is displayed during a first time, image 272 is displayed during a second time, image 373 is displayed during a third time, and so on. FIG. 8 illustrates a flow diagram of a method of sequentially displaying images during screensaver mode in accordance with a specific embodiment of the present disclosure, where at node 381, a request to access a file, such as an image file, referenced by LINK1 is provided by the screensaver module. At node 382, the file referenced by the LINK1 is displayed at the display device. At node 383, a delay is introduced indicating how long to wait before the image being displayed at the display device is updated. In one embodiment, the delay can be provided by a user to a field of the previously described preference window (FIG. 4). At node 384, a request to access a file referenced by a next link, e.g., LINK2, is provided by the screensaver module, and downloaded to the data processor and prepared for display. At node 385, the next image is displayed, thereby replacing the prior image. It will be appreciated, that the next image to be displayed can be downloaded during the wait described at node 383. Furthermore, in accordance with a specific embodiment of the present disclosure, a downloaded image is not stored locally subsequent to being displayed thereby reducing required storage space. The flow of FIG. 8 returns to node 383 to facilitate sequentially displaying images during screensaver mode.

Figure 9:
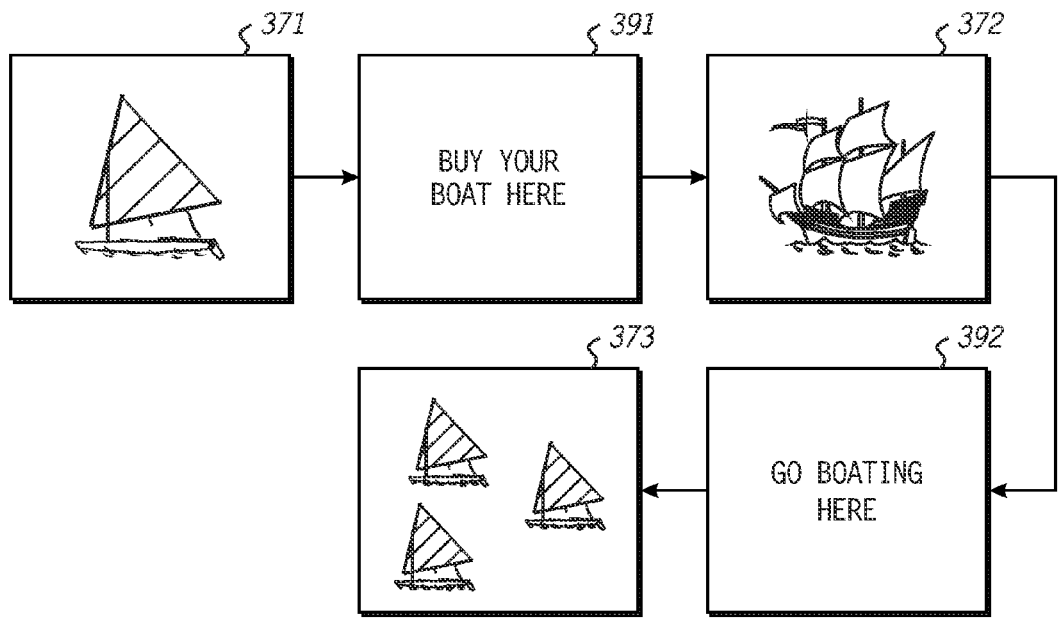
FIG. 9 illustrates a sequence of images sequentially displayed at a display device in accordance with a specific embodiment of the present disclosure disclosed at FIG. 10.
Figure 10:
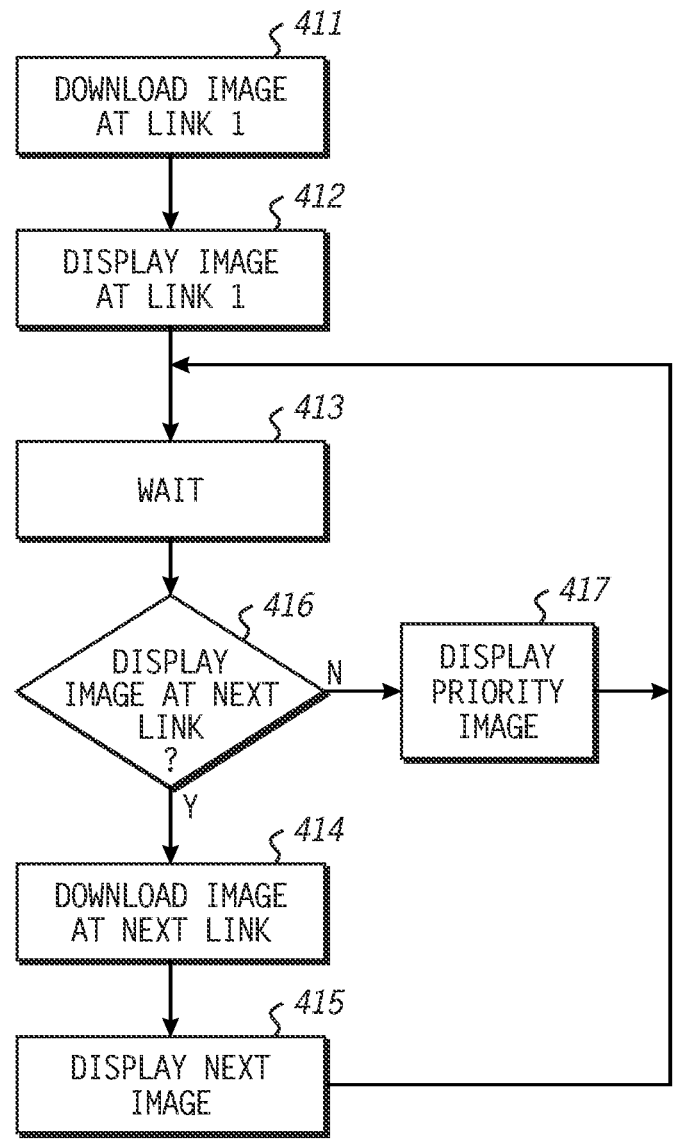
FIG. 10 illustrates a flow diagram of a method in accordance with a specific embodiment of the present disclosure.

FIGS. 9 and 10 illustrate an alternate screensaver mode, whereby images received as a result of the user-defined search query are provided sequentially along with priority images. For example, referring to FIG. 9, the images 371, 372, and 373 previously illustrated at FIG. 7, which were identified by a user-defined search, continue to be displayed. However, priority images 391 and 392 are now being interlaced along with the images 371-373. As specifically illustrated at FIG. 9, image 371 is displayed at a first time, priority image 391 is displayed at second time, retrieved image 372 is displayed at a third time, priority image 392 is displayed at a fourth time, retrieved image 373 is displayed at a fifth time, and so on. The priority images can be images provided by advertisers, or other images that is not specifically retrieved as a result of the user search. FIG. 10 illustrates in flow diagram form, a method in accordance with providing the interlaced priority images.

FIG. 10 illustrates a flow diagram of a method of sequentially displaying images during screensaver mode in accordance with a specific embodiment of the present disclosure, where at node 411, a request to access a file referenced by LINK1 is provided by the screensaver module. At node 412, the file referenced by the LINK1 is displayed at the display device. At node 413, a delay is introduced indicating how long to wait before the image being displayed at the display device is updated. In one embodiment, the delay can be provided by a user to a field of the previously described preference window (FIG. 4). At node 416 a determination is made whether the image reference by the next retrieved link is to be displayed. If so, flow proceeds to node 414, otherwise flow proceed to node 417. At node 417, instead of downloading a next file referenced by a retrieved link, a priority image is displayed before flow returns to node 413. When the image at the next retrieved link is to be displayed, flow proceeds to node 414. At node 414, a request to access a file referenced by a next link, e.g., LINK2, is provided by the screensaver module and downloaded by the screensaver module. At node 415, the next image is displayed, thereby replacing the prior image. The flow of FIG. 10 returns to node 413 from node 415 to facilitate sequentially displaying additional images during screensaver mode.

Figure 11:
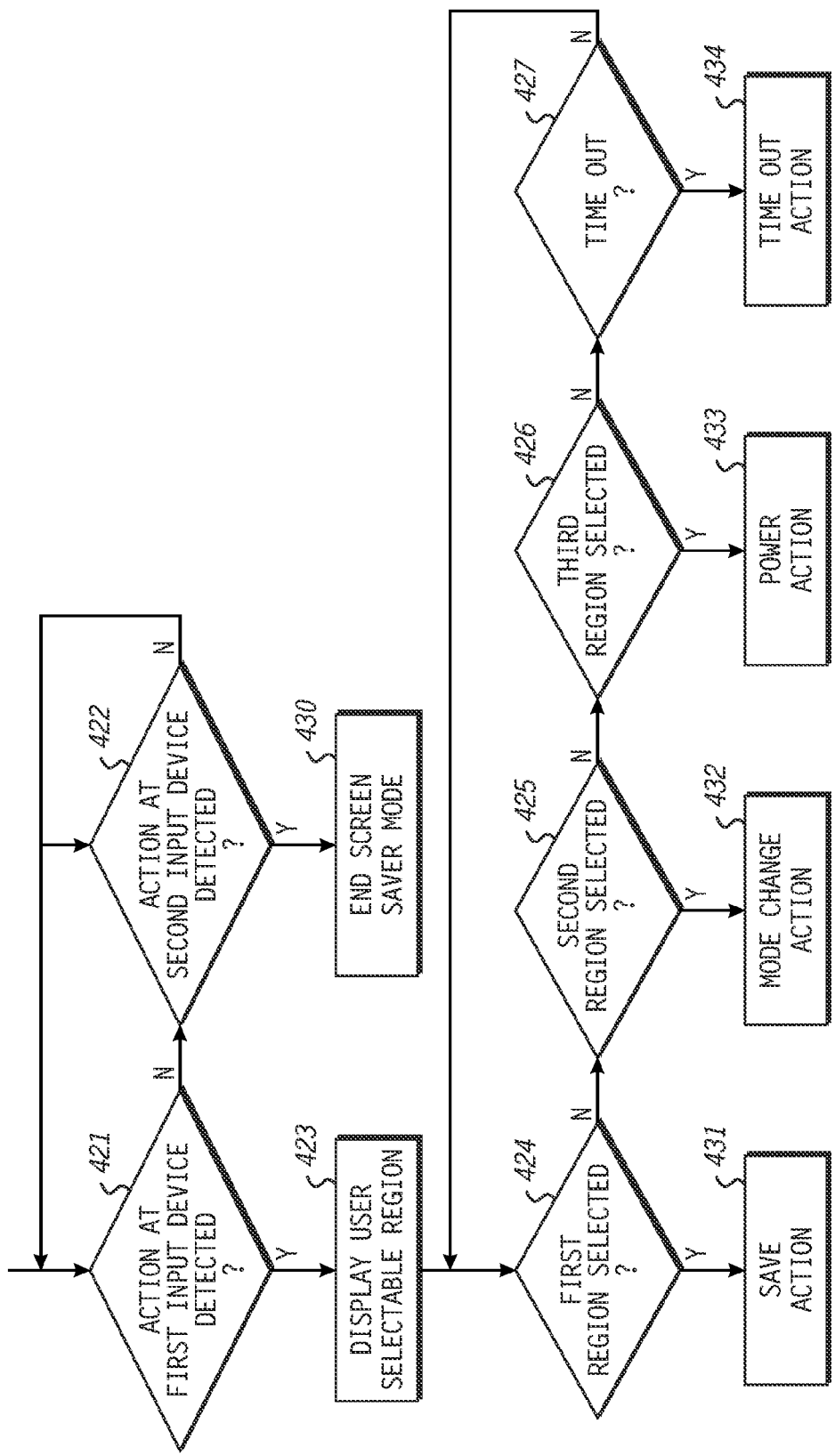
FIG. 11 illustrates a flow diagram of a method in accordance with a specific embodiment of the present disclosure.
Figure 12:
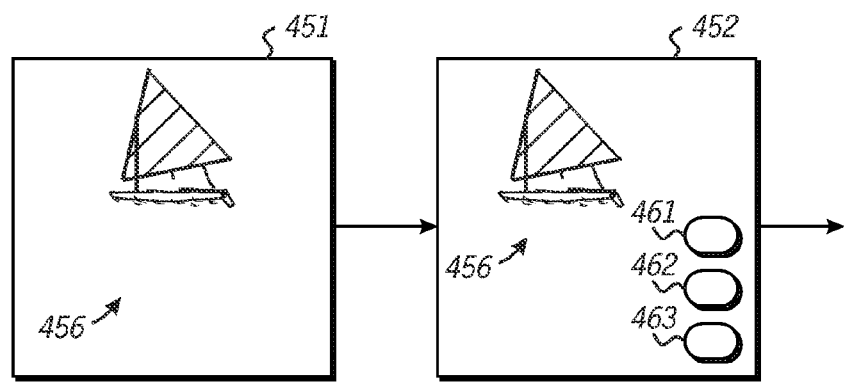
FIG. 12 illustrates a sequence of images sequentially displayed at a display device in accordance with a specific embodiment of the present disclosure.
Figure 13:
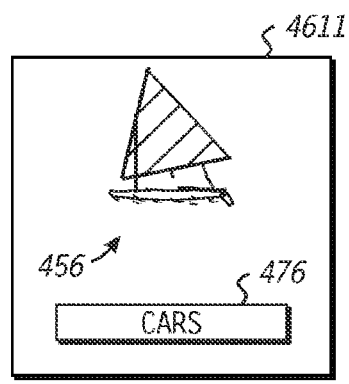
FIG. 13 illustrates an image in accordance with a specific embodiment of the present disclosure.

FIGS. 11-14 illustrate various embodiments of screensaver mode features. FIG. 11 illustrates a flow diagram of a method in accordance with a specific embodiment of the present disclosure, where at node 421, a determination is made whether or not an action has occurred at a first input device. The first input device can be a mouse, a keyboard, a button, a touch screen, and the like. If an action has occurred, flow proceeds to node 423 where a user selectable region is displayed at a display device in response to the occurrence. For example, referring to FIG. 12, image 451 is a current image being displayed at a display device during screensaver mode prior to the user action occurring at the first device. Upon detecting the action, the screensaver module displays the user selectable regions 461-463 along with the current image, which includes sailboat 456. Examples of specific actions include moving a mouse to cause cursor movement, pressing a mouse button, e.g., clicking the mouse button, pressing specific keyboard keys, and the like.

The flow proceeds to node 422 from node 421 if an action is not detected at the first input device. At node 422, a determination is made whether or not an action has been detected at a second input device. For example, the second input device can be a keyboard while the first input device is a mouse. If no action is detected at node 422, flow returns to node 421, otherwise flow proceeds to node 430. At node 430, the screensaver mode is exited to resume a different operating mode at the data processor, such as a normal mode of operation.

Subsequent to displaying a user-selectable region at node 423, flow proceeds to node 424. At node 424 a determination is made whether or not a first user selectable region, such as region 461 of FIG. 10, has been selected by a user. If so, the flow proceeds to node 431, otherwise, flow proceeds to node 425. At node 425 a determination is made whether or not a second user selectable region, such as region 462 of FIG. 10, has been selected by a user. If so, flow proceeds to node 432, otherwise, flow proceeds to node 426. At node 426, a determination is made whether or not a third user selectable region, such as region 463 of FIG. 10, has been selected by a user. If so, flow proceeds to node 433, otherwise, flow proceeds to node 427. At node 427, a determination is made whether or not a timeout criteria has been met for the screensaver mode. If so, flow proceeds to node 434, otherwise, flow returns to node 424 to continue monitoring for a selected region.

Figure 14:
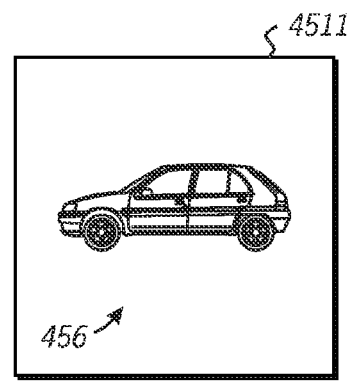
FIG. 14 illustrates an image in accordance with a specific embodiment of the present disclosure.

It will be appreciated that each user selectable region is associated with a different action. For example, at node 431 a save action is performed in response to the first user selectable region being selected. The save action can save the image being displayed at to the data processor, save the link referencing the image being displayed, and the like. At node 432 a change-of-operation action is performed in response to the second user selectable region being selected. The change-of-operation action results in screensaver mode being exited, and a different mode of operation being entered. For example, the data processor can return to a normal mode of operation. At node 433 a change-of-power action is performed in response to the third user selectable region being selected. The change-of-power action results in the data processor entering a different power state, such as a low-power mode of operation, an off mode, and the like. At node 434 an action is performed in response to a timeout occurring, such as an inactivity time, during screensaver mode. The action can include a change-of-power action, a change-of-operation action, and the like. It will be appreciated that there are many other actions that can be associated with the user selectable regions of FIG. 12. For example, in response to a user selectable region being selected a user input field can be displayed, while remaining in screensaver mode, such as user input field 476 illustrated at FIG. 13, that allows the user to input a new search criteria, that results in a new set of links being retrieved and images generated. Therefore, FIG. 14 illustrates an image displayed by the screensaver mode after the user has modified the search criteria to be based upon the term "cars". In another embodiment, in addition to saving the image being displayed, another operation associated with the saved image can be performed, such as preparing an email including the image, identifying the image as an available or current wallpaper, and the like. Selection of a user-selectable region can result in opening a specific application, such as a browser, as part of a normal operating mode of the data processor, or dialing a defined phone number.

Figure 15:
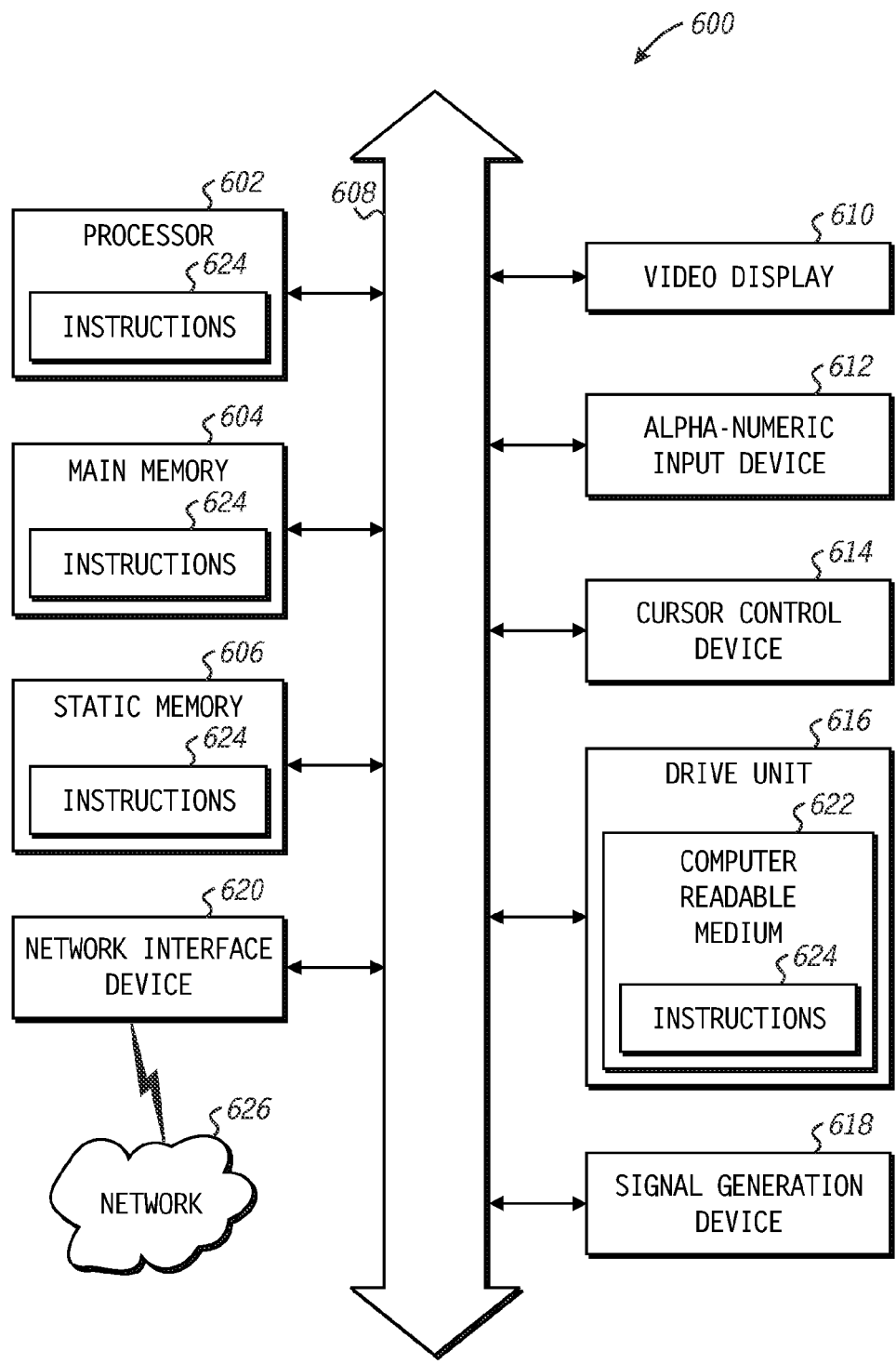
FIG. 15 illustrates a block diagram of a general computer system.

FIG. 15 shows an illustrative embodiment of a general computer system 600 in accordance with at least one embodiment of the present disclosure. The computer system 600 can include a set of instructions that can be executed to cause the computer system 600 to perform anyone or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as: a personal computer (PC); a tablet PC, a set-top box (STB), a handheld device such as a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624, or receives and executes instructions 624, responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

For example, the various fields and options illustrated at FIG. 4 can be associated with various other options. For example, one or more option fields of a preference window could be used to enable a content checker to ensure only child appropriate content is displayed during screensaver mode. The content checker can be a feature of the search engine, or a feature local to the data processor. Similarly, the data processing device implementing the described screensaver mode can be a handheld device, that can include a mobile phone. Such a handheld device can include a touch screen, whereby data entry into the preference window, for example, is via the touch screen. Also, with respect to a data processor having a touch screed, an input device can include the touch screen, whereby a user action at the touch screen, for example, would provide user-selectable region, such as a pop-up menu or button, that can be selected by the user by touching the screen to execute a defined actions, such as those described herein.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:
1. A method comprising:
receiving, by a media processor, prior to entering a screensaver mode of operation, a search criteria identifying a requested subject matter;
entering, by the media processor, the screensaver mode of operation;

in response to entering the screensaver mode, automatically transmitting, by the media processor, the search criteria identifying the requested subject matter to a web browser;

receiving, by the media processor, a set of uniform resource locators from the web browser based upon the search criteria;

sequentially presenting, by the media processor at a display device during the screensaver mode, image content referenced by the set of uniform resource locators;

receiving, by the media processor during the screensaver mode, user input from a first input device of the media processor during a presentation of a first image associated with a first uniform resource locator of the set of uniform resource locators;

in response to receiving the user input from the first input device, presenting, by the media processor during the screensaver mode, a user-selectable region comprising a selectable element superimposed on the first image, wherein the user-selectable region includes a selectable graphical element superimposed on a graphical interface for presenting the first image;

detecting, by the media processor during the screensaver mode, a selection of a first element of the selectable element;

causing, by the media processor during the screensaver mode, a defined action responsive to the selection of the first element; and in response to receiving the user input from a second input device, ceasing, by the media processor, the presenting of the image content at the first image.

2. The method of claim 1, comprising only presenting image content referenced by uniform resource locators corresponding to image files, wherein priority image content provided by an advertiser that is not specifically received within the set of uniform resource locators from the web browsers based upon the search criteria.

3. The method of claim 2, wherein the image files correspond to still image files, and wherein the receiving of the search criteria identifying requested subject matter comprises receiving a last search criteria provided to a search engine prior to entering the screensaver mode.

4. The method of claim 2, wherein the image files correspond to video image files.

5. The method of claim 1, comprising limiting a subject of the search criteria to image files.

6. The method of claim 1, comprising receiving the search criteria identifying the requested subject matter from the user input prior to entering the screensaver mode.

7. The method of claim 6, comprising receiving the user input through a preference interface associated with the screensaver mode.

8. The method of claim 1, wherein the search criteria is based on a last user-initiated search query to a web-based search engine.

9. The method of claim 1, wherein the defined action causes a storage of information relating to the first image.

10. The method of claim 1, wherein the defined action causes a storage of the first image referenced by the first uniform resource locator in a memory device as stored content.

11. The method of claim 10, wherein the stored content is identified as a current wallpaper background.

12. The method of claim 1, wherein the defined action causes a storage of the first uniform resource locator of the first image.

13. The method of claim 1, wherein the defined action causes an exiting of the screensaver mode and an opening of a website page within a browser referenced by the first uniform resource locator associated with the first image.

14. The method of claim 1, wherein the defined action causes a generation of an e-mail message having an attachment with content referenced by a link associated with the first image.

15. The method of claim 1, wherein the defined action causes a presentation of a field at the display device for entering new search criteria identifying new requested subject matter during screensaver mode; and wherein the method comprises:

receiving the new search criteria identifying the new requested subject matter;

transmitting a new search request based on the new search criteria identifying the new requested subject matter;

receiving a new set of uniform resource locators based upon the new search criteria identifying the new requested subject matter; and sequentially presenting at the display device, image content referenced by the new set of uniform resource locators during the screensaver mode.

16. The method of claim 1, comprising detecting the selection of the first element at the first input device.

17. The method of claim 1, wherein the defined action causes an exiting of the screensaver mode.

18. The method of claim 16, wherein the first input device is one of a mouse, or a keyboard.

19. The method of claim 16, wherein the first input device is a mouse, and wherein the selection of the first element is detected by a cursor being moved.

20. The method of claim 16, wherein the first input device is a mouse, and wherein the selection of the first element is detected by a mouse click.

21. The method of claim 1, wherein the search criteria indicates the search is to provide child appropriate content.

22. The method of claim 1, wherein the image content is child appropriate.

23. A method comprising:

receiving, at a handheld communication device, prior to entering a screensaver mode of operation, a search criteria identifying a requested subject matter;

entering the screensaver mode of operation at the handheld communication device;

in response to entering the screensaver mode, automatically transmitting from the handheld communication device the search criteria identifying the requested subject matter to a web browser;

receiving, at the handheld communication device in response to automatically transmitting the search criteria, a set of uniform resource locators from the web browser based upon the search criteria; and sequentially presenting at a display of the handheld communication device during the screensaver mode, image content referenced by the set of uniform resource locators receiving, by the handheld communication device during the screensaver mode, user input at an input component of the handheld communication device during a presentation of a first image associated with a first uniform resource locator of the set of uniform resource locators;

in response to receiving the user input from a first input device, presenting, by the handheld communication device during the screensaver mode, a user-selectable region comprising a selectable element superimposed on the first image, wherein the user-selectable region includes a selectable graphical element superimposed on a graphical interface for presenting the first image;

detecting, by the handheld communication device during the screensaver mode, a selection of a first element of the selectable element;

causing, by the handheld communication device, a defined action responsive to the selection of the first element; and in response to receiving the user input from a second input device, ceasing, by the handheld communication device, the presenting of the image content at the first image.

24. A portable device, comprising a memory to store executable instructions and being coupled to a processor, wherein the processor, responsive to executing the instructions, performs operations, comprising:

receiving, prior to entering a screensaver mode of operation, a search criteria identifying a requested subject matter;

entering the screensaver mode of operation;

in response to entering the screensaver mode of operation, automatically transmitting to a search engine the search criteria identifying the requested subject matter to a web browser;

receiving from the web browser a set of uniform resource locators in response to the transmitting of the search criteria identifying the requested subject matter;

sequentially presenting image content referenced by uniform resource locators of the set of uniform resource locators during the screensaver mode of operation;

presenting, during the screensaver mode, a user-selectable region comprising a selectable graphical element superimposed on a graphical interface for presenting a first image;

causing a defined action responsive to selection of the selectable graphical element; and ceasing, during the screensaver mode of operation, the presenting of the image content at the first image responsive to an input signal received via an input component of the portable device, wherein the first image is associated with a first uniform resource locator of the set of uniform resource locators.

* * * * *